United States Patent [19]
Georget

[11] 3,806,875
[45] Apr. 23, 1974

[54] REMOTE DATA READING AND TRANSMISSION TECHNIQUE

[75] Inventor: Philippe Georget, Montrouge, France

[73] Assignee: Compagnie Des Compteurs, Paris, France

[22] Filed: Oct. 26, 1971

[21] Appl. No.: 192,447

[30] Foreign Application Priority Data
Oct. 26, 1970  France .............................. 70.38560
May 17, 1971  France .............................. 71.17762

[52] U.S. Cl. ...... 340/151 R, 340/380 R, 340/38 DR
[51] Int. Cl. .............................................. G09f 9/00
[58] Field of Search ......... 340/380 R, 150 R, 151 R

[56]           References Cited
          UNITED STATES PATENTS
2,806,402  9/1957  Ferris ..................... 340/380 R UX
3,467,960  9/1969  Hosker ..................... 340/380 R X
3,538,312  11/1970  Genahr ...................... 340/380 X
3,539,777  11/1970  Rohland ..................... 340/380 X
3,562,746  2/1971  Aron ........................ 340/380 R
3,590,774  7/1971  Solow ....................... 340/380 X Primary Examiner—Harold I. Pitts
Attorney, Agent, or Firm—William R. Sherman; Stewart F. Moore; Roylance, Abrams, Berdo & Kaul

[57]                 ABSTRACT

An illustrative embodiment of the invention described includes a meter having interrogation and reading means for remote transmission of the data optically displayed by tracks of its counting unit. The meter is connected in a chain of meters wherein the end of the reading of data from one meter triggers interrogation of the next one. Data optically displayed by the meter are converted into electrical signals by means of fiber optic transmission bundles which illuminate the data displaying tracks and pick up reflected light and transmit it to a photoelectric detector. Switch means are provided for scanning the various data displaying tracks of the meter to produce sequential output electrical signals representative of the data.

12 Claims, 25 Drawing Figures

CENTRAL
INTERROGATION
STATION

CENTRAL INTERROGATION STATION

MEASURING DEVICE

INVENTOR.
Philippe Georget
BY William R. Sherman
ATTORNEY

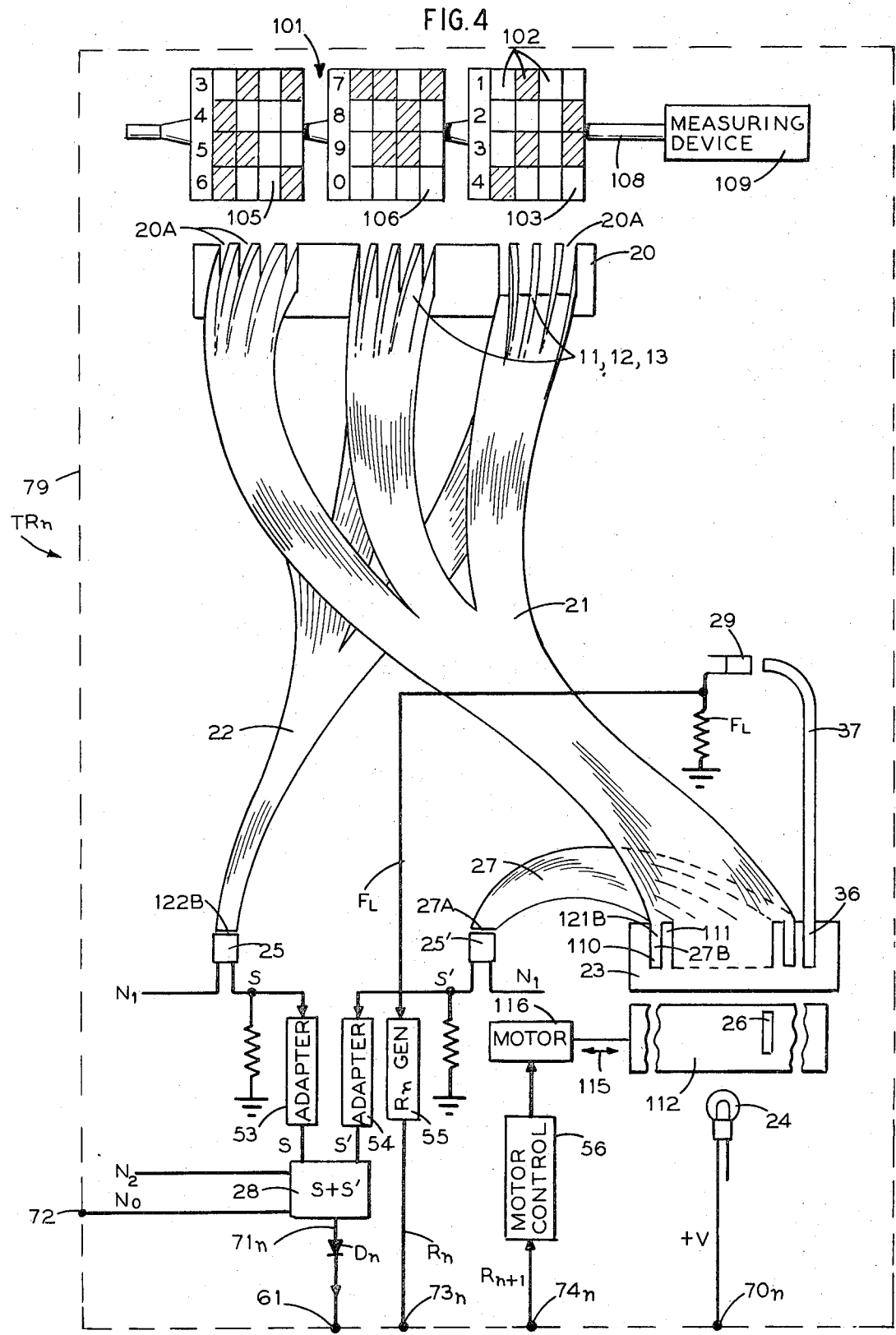

REMOTE DATA READING AND TRANSMISSION TECHNIQUE

FIELD OF THE INVENTION

The present invention relates to data reading and transmitting techniques and more particularly to optical reading of data displayed by the counting unit of meters for remote transmission thereof.

BACKGROUND OF THE INVENTION

In the automatic tele-transmission of the indications of meters such as utility meters, for example, there is a need for a simple and reliable sensor for converting into corresponding electrical signals indications from a counting unit having numbered wheels or rollers driven by a measuring device to represent a metered quantity. The indications are generally coded in binary form on coded tracks on the rollers. The coded tracks normally are adjacent to a track bearing numbers also carried by the roller. These rollers are driven in a well known manner by a totalizer mechanism which is coupled to the measuring device to be responsive to a physical parameter such as flow of water or gas, or consumption of electrical power.

Depending on the type of sensor used, these tracks can make use of mechanical, electrical, magnetic or optical characteristics for differentiating between the binary digits 0 and 1.

Mechanical or electrical characteristics have the disadvantage of involving the use of feelers or wipers, which generate parasitic resisting torques and are subject to wear, leading to rather poor reliability. The use of magnetic characteristics also runs the risk of introducing parasitic torques and only protects the sensor imperfectly against tampering and fraud. The contactless sensing of the data by photoelectric means is thus preferable, the coded tracks then presenting two different optical characteristics of reflection ( or transmission) providing a variation of intensity or color of the light reflected or transmitted.

However, the known optical scanning devices used for scanning the tracks — of which there are usually at least four per roller, coded in binary code — of the four or five rollers of a totalizer mechanism, generally require rotating mirrors or equivalent means. This has the disadvantage of leading to a heavy and cumbersome movable assembly; moreover, the influence of parasitic light is not eliminated and frauds are possible.

SUMMARY OF THE INVENTION

An object of the invention is to provide a reading device of the photoelectric type in which these disadvantages are to a large extent eliminated.

In accordance with the concepts of this invention meter reading and transmitting apparatus is provided adapted for remote transmission of data displayed by one or more surfaces of a counting unit. These data are represented by zones having different optical reflection characteristics which vary in response to the totalizing mechanism of said counting unit. Means such as fiber optic light transmitting means are provided for illuminating said display surfaces. Fiber optics type receiver means with a receiving end opposite the surface are arranged to pick up the light reflected by said display surfaces and transmit it to a photoelectric detector. Electrical signals representative of said data are available at the output of said photoelectric detector for transmission. Advantageously, means are provided for sequentially producing signals representative of data from different display surfaces for series transmission on a common circuit.

An advantage resulting from this feature is an effective protection against parasitic light and the risk of fraud: fiber optic ends can be maintained at a very small distance from the coded surfaces, for example about one millimeter, and thus a photoelectric detector is influenced exclusively by the characteristic, for example, white or black (reflecting or not ), of the zone of a track surface facing the receiving end of a fiber optic receiver.

Further advantages are increased reliability and reduced size and the fact that the invention may be carried out in a purely static embodiment.

The invention will be better understood with reference to the following description and the accompanying drawings which represent by way of non-limiting examples, various embodiments in accordance with the invention.

BRIEF DESCRIPTION OF THE DRAWINGS

FIG. 4 is a schematic diagram of a meter station with mechanical input light switching;

DESCRIPTION OF VARIOUS EMBODIMENTS

Figure 1:
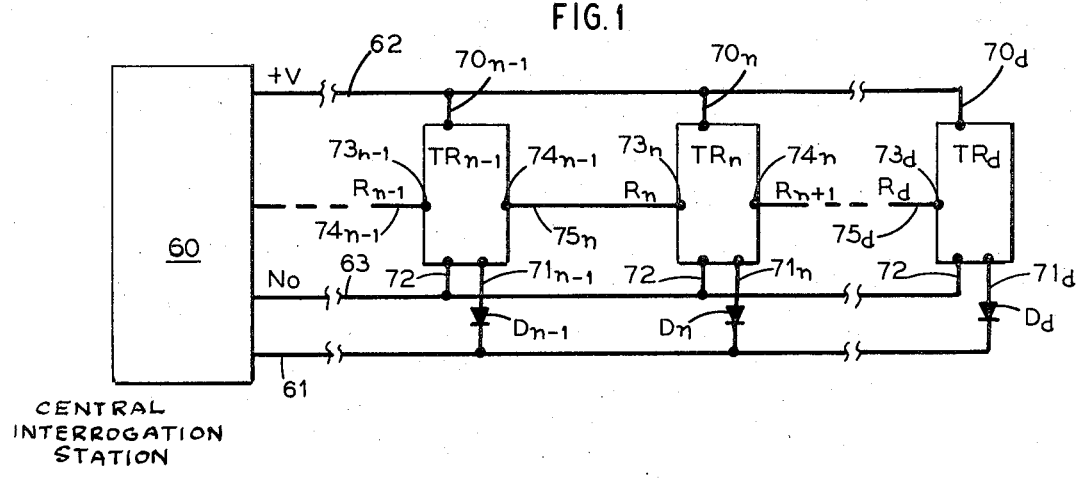
FIG. 1 is a schematic diagram of remote meter reading apparatus embodying the invention.

In FIG. 1, $TR_a, \ldots TR_n, TR_{n-1}, \ldots$ designate a series of local meter interrogation stations of remote reading apparatus constructed in accordance with the invention wherein the stations are connected in cascade. A central interrogation station 60 has an electric power supply (not shown) to which a supply line 62 is connected. Line 62 when energized from the station 60 supplies power to the inputs $70_a, \ldots 70_n, 70_{n-1}$, etc. of the stations TR. The station 60 receives the electrical data signals from the local stations via a line 61 through diodes $D_d, \ldots D_n, D_{n-1}$, etc. at the outputs $71_d$ to $71_n$, $71_{n-1}$, etc. of the stations TR. A line 63 also connected to the central station 60 is adapted to provide a reference voltage signal to the input 72 of each station TR.

In operation, after all the data displayed by the counting unit contained in the local station $TR_n$ have been read and transmitted along the line 61, the local station $TR_n$ causes the triggering of the interrogation of the following station $TR_{n-1}$ by a signal $R_n$, and so on as will be explained later. To this end the stations TR have each an "end of reading" output $73_d$, $73_n$, $73_{n-1}$, etc., and a triggering input such as $74_n$, $74_{n-1}$, etc., output $73_n$ being connected to input $74_{n-1}$ by a conductor 75, and so on.

Figure 2:
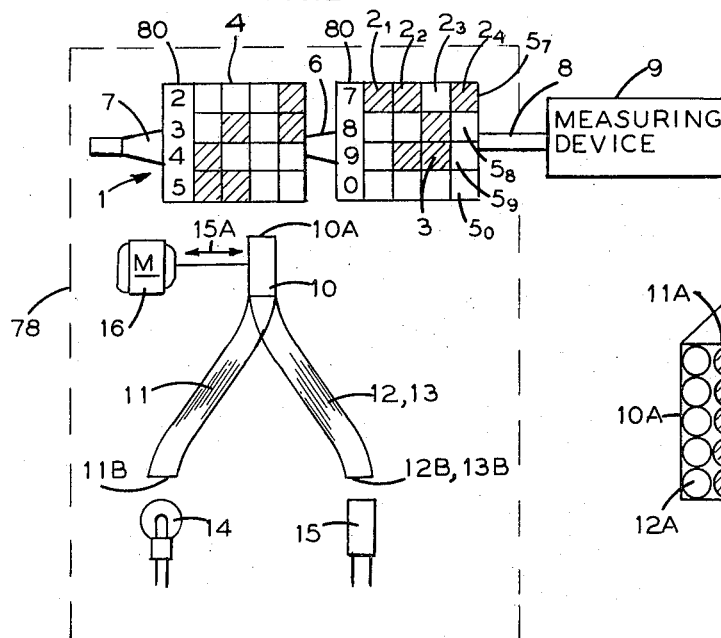
FIG. 2 is a schematic diagram of a meter counting unit comprising an elementary reading probe.

Turning now to FIG. 2, there is shown in a schematic manner a meter including a counting unit which can be employed in a local station like $TR_n$, for the purpose of illustrating the principles of the invention. In a casing 78 is mounted a totalizing mechanism comprising a series of coaxial rollers such as 3, 4 . . . mounted on shafts 6, 7 . . . , the first roller 3 of the series being driven by the output shaft 8 of a measuring device 9 of the meter. By way of example, this measuring device 9 may be responsive to electrical energy consumed by a user. The consumption of energy is represented by angular displacement of shaft 8 which is totalized by the totalizer mechanism 1 in which, according to a typical and well known arrangement, a complete revolution of roller 3 rotates roller 4 a fraction according to its number base. The instant position of the rollers 3 and 4 is an indication of the metered quantity and is typically determined by numerical indicia such as numbers 0 to 9 drawn at regular spacings about the periphery thereof, or as binary coded representations of such numbers. These indicia when read opposite a reference position, such as the position of a reading window or sensor, provide a display of data representing the metered quantity. The value represented by the indicia in a display surface at the reference position varies in response to the metered quantity.

In FIG. 2, the rollers 3 and 4 are represented as having, for example, a left track 80 containing figures 0 to 9 in addition to four peripheral tracks $2_1, 2_2, 2_3, 2_4$ juxtaposed at the right of the track 80. The juxtaposed tracks $2_1$ to $2_4$ have zones of two different optical reflections characteristics (such as black and white) which are disposed around the respective roller in ten axial rows, such as $5_7, 5_8, 5_9$ and $5_0$. Each row has four zones axially aligned with a corresponding figure of track 80. The arrangement of black and white zones in each row 5 is made according to a binary coded representation of the figure to the left of said row as can be seen for rollers 3 and 4.

Figure 3A:
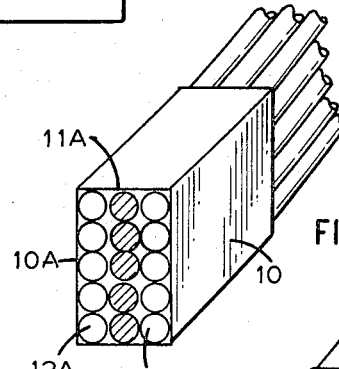
FIGS. 3A and 3B give examples of possible terminal faces for the probe represented in FIG. 2.
Figure 3B:
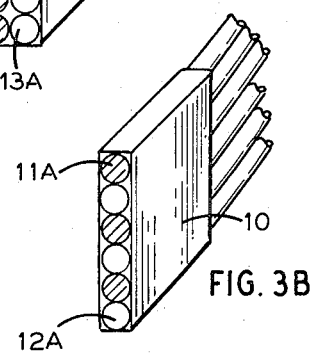

In FIG. 2, there is schematically shown an elementary probe 10 constituted by an elongated bundle of light transmitting optical fibers 11, this transmitting bundle being, for example, sandwiched between two bundles of light receiving optical fibers 12 and 13. The end of this probe 10, i.e., reading head 10A which is intended to scan sequentially the coded tracks 2 of the rollers 3, 4 . . . etc. of the totalizer 1, is represented by FIG. 3A. Head 10A is comprised of a plurality of vertically juxtaposed light-emitting ends 11A (cross-hatched) of the transmitting fibers 11 sandwiched between respective light receiving ends 12A and 13A of receiving fibers 12 and 13, together forming a light receiving end for said reading head. FIG. 3B shows another possible arrangement of fiber ends 11A and 12A vertically interlaced to constitute the emitting and receiving ends in the reading head.

The other fiber ends 11B of the transmitting bundle 11 form the admitting end thereof and can be illuminated by a source of light 14, such as an incandescent lamp or an electroluminescent diode (ELD). Output fiber ends 12B and 13B of the receiving bundles 12 and 13 are tied together to form an output end for said bundles opposite a photoelectric detector 15, for example a photo-diode or a photo-sensitive resistor. The optical guides or fibers constituting the light conductors 11, 12, 13 for transmitting light between their respective ends can be flexible glass or plastic fibers.

The reading head 10A of the probe 10 is arranged for detecting by reflection the existence of a reflecting or absorbing zone, or white or black zone as stated before, on the surface of the coded track facing the probe. Means such as a motor 16 is provided for displacing the probe, lamp and detector axially as shown by arrow 16A for sequentially scanning the juxtaposed coded tracks 2 of each roller 3, 4 . . . of the totalizer 1, while maintaining its terminal face or reading head 10A at an approximately constant distance from the tracks, typically on the order of 1 millimeter, by means of suitable guides not shown. The motor 16 may consist of a flexible blade driven by an electric or electromagnetic motor element, or a bimetallic strip.

In operation, light from light source 14 enters the admitting fibers ends 11B of the transmitting bundle 11 and is emitted by the respective emitting fiber ends 11A thus illuminating the surface of the track which is opposite the probe 10 at a given time. According to the nature of the illuminated zone (black or white) of said surface, the amount of light reflected by this surface and picked up by receiving fiber ends 12B and 13B for transmission through the bundles of fibers 12 and 13 to the detector 15 is representative of the data or digit displayed by the track. It is then possible to pick up at the output of the detector 15 electrical signals S having two logic levels 0 and 1, which represent in binary code the digit indicated by each track. The signals S successively obtained by scanning four juxtaposed tracks on a roller represent the numerical value displayed by the roller.

According to another embodiment of the invention a "pseudo-static" arrangement is provided in which the fibers remain stationary, several examples of which will be discussed with reference to FIGS. 4 to 13. Turning to FIG. 4, an embodiment of a meter enclosed in a housing 79 is schematically shown in which a measuring device 109 drives a counting unit comprising a totalizing mechanism 101 driven by the output shaft 108 of device 109, with data displaying rollers 103, 104, 105 with four binary coded tracks 102 on each one of them.

An elongated probe 20 having as many reading heads 20A as there are coded tracks 102 to be read is mounted along the row of rollers so that the emitting and receiving ends in the reading head are located a short distance from the respective tracks.

Each reading head 20A is the terminal part of elementary transmitting and receiving bundles of optical fibers, for example of the type indicated in FIG. 3A, with fiber ends such as 11A and 12A, 13A forming emitting and receiving ends, respectively. The elementary receiving bundles such as 12 and 13 of FIG. 2 are tied together in a single bundle 22 having an output end 122B common to all elementary bundles opposite a photoelectric detector 25. All the elementary transmitting bundles leading to the respective reading heads 20A define a transmitting bundle 21. At the other end of bundle 21 the light admitting fiber ends such as 11B of each elementary transmitting bundle form a series of elementary light admitting ends 121B which are mounted respectively at intervals 110 formed between teeth 111 of a comb-like member 23. The comb member 23 can be lit by a luminous source 24 through a slot 26 in a sweep plate 112 movable as shown by the arrow 115 to switch the light from the source 24 across the comb member. The slot 26 is shaped and sized to the dimension of an interval 110 of the comblike member 23. The plate 112 is interposed between the light source 24 and the member 23 and can be made of a light obstructing material either opaque or at least affecting the passage of light rays therethrough to differentiate them from those rays which pass through the slot 26. An opaque plate 112 is used in this example. In the course of the displacement, the slot 26 passes successively across each of the light admitting ends 121B of the elementary transmitting bundles in the bundle 21. This accomplishes a sequential illumination of the various coded tracks 102 of the rollers 103, 104 ... of the totalizer 101, and the binary data representing light received at the output end 122B of the receiving bundle 22 is converted by the detector 25 into corresponding electrical signals S which are delivered in series form at the output thereof.

The plate 112 is actuated to sweep along the comb-like member 23 in either direction by a motor schematically represented at 116 mechanically coupled to the plate 112. This arrangement will be better seen by looking at FIGS. 5 and 6.

Figure 6:
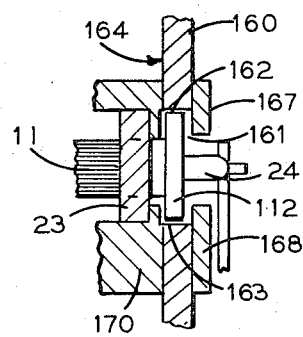
FIG. 6 is a cross-sectional view of the switching means of FIG. 5 taken along line VI — VI.

The motor 116 carries a rotatable driving arm 185 or rod and is mounted on a base plate 160 secured to the housing 79. The base 160 has a rectangular opening 161 formed therein which can accommodate the plate 112 with its top and bottom edges 162 and 163 sliding against the corresponding top and bottom inner edges of the opening 161. The length of the opening 161 is greater than the length of the plate 112 to permit the same to slide between two abutment members 165 and 166 secured to the base 160. The plate 112 is retained in slidable engagement within the opening 161 by two parallel upper and lower front plates 167 and 168 secured to the base to slightly overlap the top and bottom edges of the opening 161 and by a bundle supporting member 170 attached to the rear face 164 of the base 160 about the opening to prevent rearward movement of the plate 112 with respect to the base. Suitable tracks are thus provided for retaining the upper and lower portions of the plate while permitting it to slide linearly. (FIG. 6).

Figure 5:
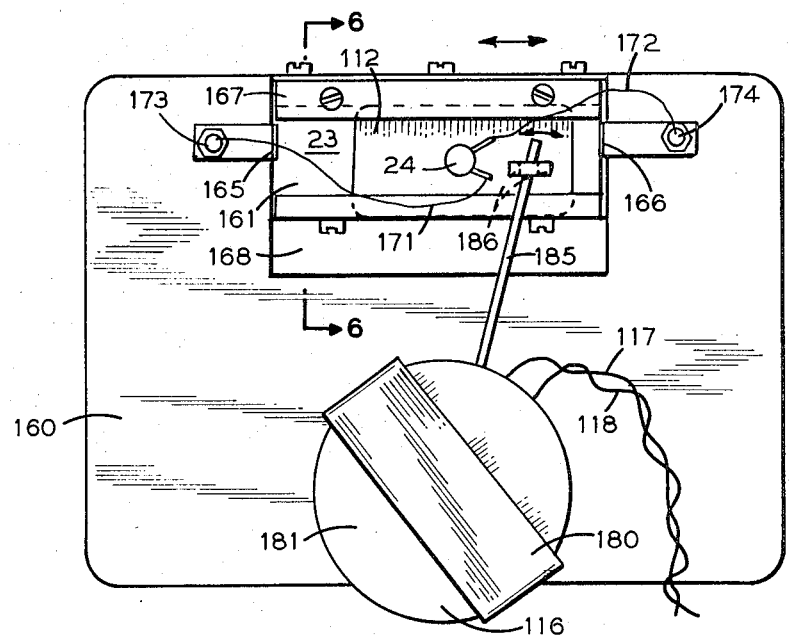
FIG. 5 is a schematic diagram of the mechanical switching means of FIG. 4.

As previously explained, the plate 112 has a vertical slot 26 of rectangular shape formed therein (perpendicularly to its sliding direction) which is hidden on FIG. 5 by the light source 24 mounted on this plate above the slot and energized by means of two flexible heads 171 and 172 respectively coupled to terminals 173 and 174 on the base. (FIG. 5).

In the bundle supporting member 170 is mounted the comb-like member 23 extending parallel to the elongated opening 161 at a short spacing from the plane of movement of the plate 112. As the plate 112 slides from its extreme right position in abutment against member 166 to its extreme left position in abutment against member 165, the travelling distance being typically in the order of one centimeter, the slot 26 sweeps across all the intervals 110 (FIG. 4) of the comb-like member 23 and stops only beyond the one most to the left before returning to its start position at the right. Therefore, light from the source 24 is passed twice to each admitting end 121B of the elementary transmitted bundles forming the bundle 21 during the round trip of the plate. This round trip produces an interrogation cycle of the meter station by switching the light transmitted through the bundle 21 to actuate one reading head 20A at a time thus producing a two-way scanning of the tracks 102.

Figure 7:
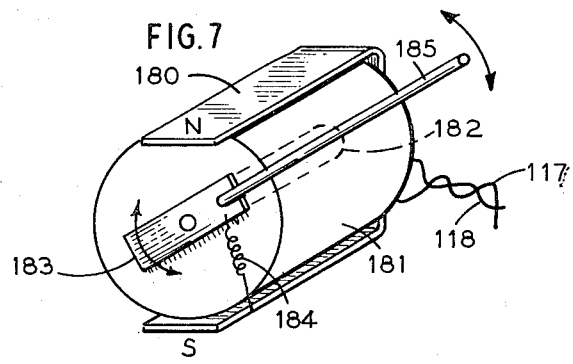
FIG. 7 shows diagrammatically the construction of the motor of FIG. 5.
Figure 8:
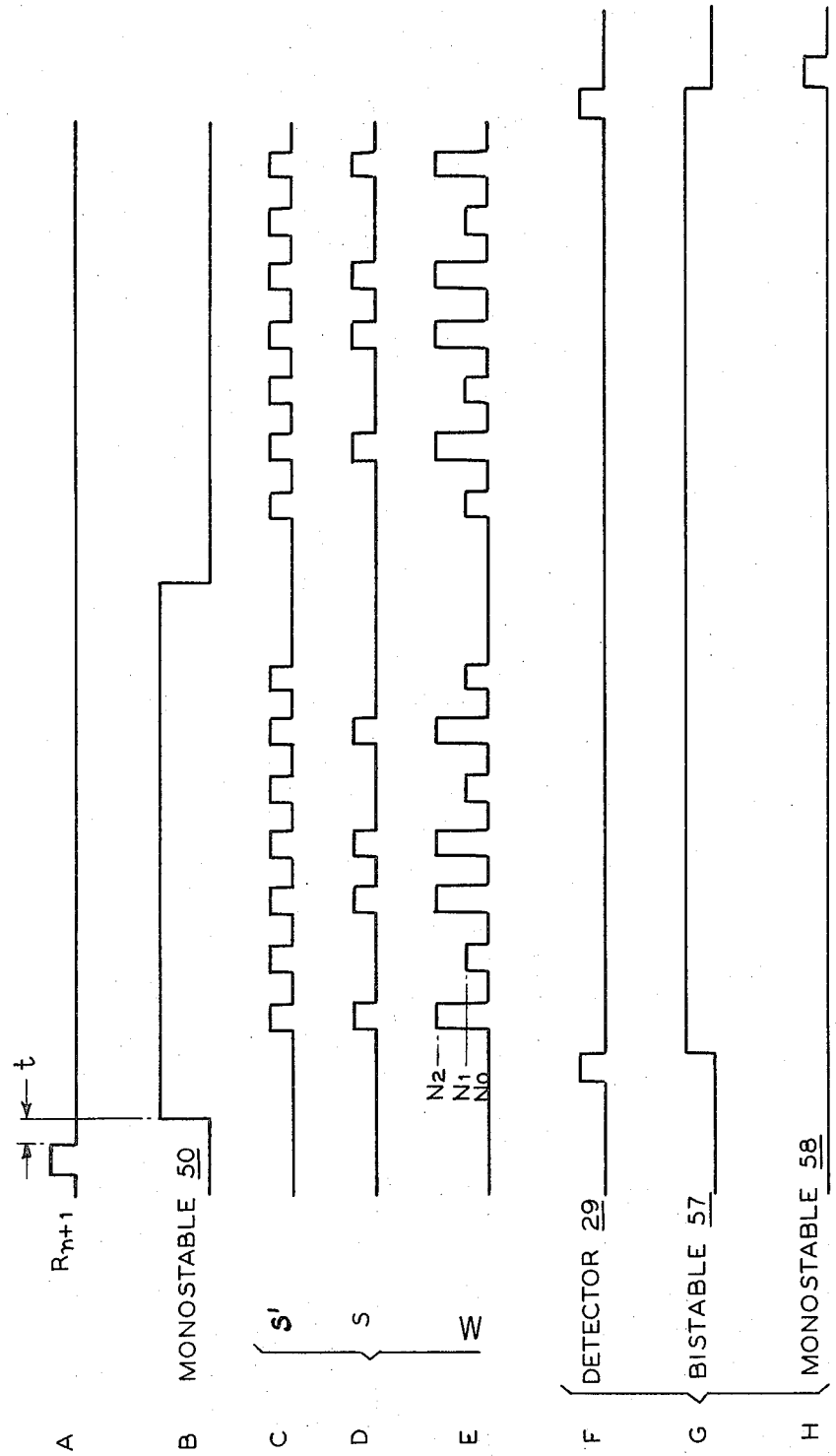
FIGS. 8A to H show diagrams of the signals involved in the operation of the meter station of FIG. 4.

The electromagnetic motor 116 schematically shown on FIG. 7 includes a U-shaped external armature 180 having respective North N and South S poles at the tips thereof, an electrical coil 181 energized by two lead wires 117 and 118, a core 182 and a magnetizable pivotable elongated blade 183. A tension spring 184 having ends attached to the blade 183 and to the armature 180, respectively, normally retains the blade in an offset angular position with respect to the axis of the poles N, S of the armature. Upon energization of the coil by an electrical current, the blade is magnetized and pivots to bring its ends in lines with the poles N and S thus putting the spring 184 under tension. As soon as the current is switched off, the spring 184 brings the blade back to its starting position (FIG. 7).

The blade 183 moves in a plane parallel to the plane of the plate 112 and is extended at one end by a driving rod 185 secured thereto. The rod 185 is slidably received between two fingers on the front face of the plate 112 (FIG. 5) for driving the plate 112 in its rectilinear tracks from its right to left extreme positions and back when the blade pivots from its starting position toward alignment with the N, S pole line and back, the movement of the blade 183 being amplified by virtue of the length of the rod.

Referring again to FIG. 4, provision is made to generate simultaneously with the data representative signals, reference signals which serve as clock signals for easier subsequent identification of the logic levels of the signals S obtained and of the rollers to which they correspond. This is particularly desirable is the movement of the slot 26 is not uniform. For this purpose, a light admitting end 27B of an elementary transmitting bundle of fibers, forming part of a further bundles a supplementary bundle 27, is interlaced with the end 121B in each interval 110 of the comb 23 so that both ends 27B and 121B admit light at the same time when the slot 26 sweeps successively across the intervals. This bundle 27 of elementary transmitting fibers terminates opposite an auxiliary photo detector 25' where all of the elementary transmitting bundles are put together to form a single supplementary output end 27A, thereby to obtain signals S' synchronous with the displacement of the slot 26, at the output of this detector 25'. The signals S coming from the photo detector 25 and the signals S' are then summed up in a circuit 28 after being shaped by respective circuits 53 and 54, the output signal $\Sigma = S + S'$ of the diode $D_n$ connected to circuit 28 being available at the output of the station $TR_n$ on the line 61.

In this manner, the summation signals furnished by the circuit 28 have two levels N1, N2 as indicated in the diagrams of FIGS. 8C to E showing respectively: the diagram of reference signal S' during the round trip of the plate 112 with one pulse for each interval 110 swept across; an example of S for the same period; and $\Sigma$. Since during the intervals between rollers there usually would be only a signal which is null or relatively small, it is easy to eliminate this parasitic signal by selectively passing only the signals of amplitude greater than a level $N_o$ provided by a reference voltage on line 63.

Figure 9:
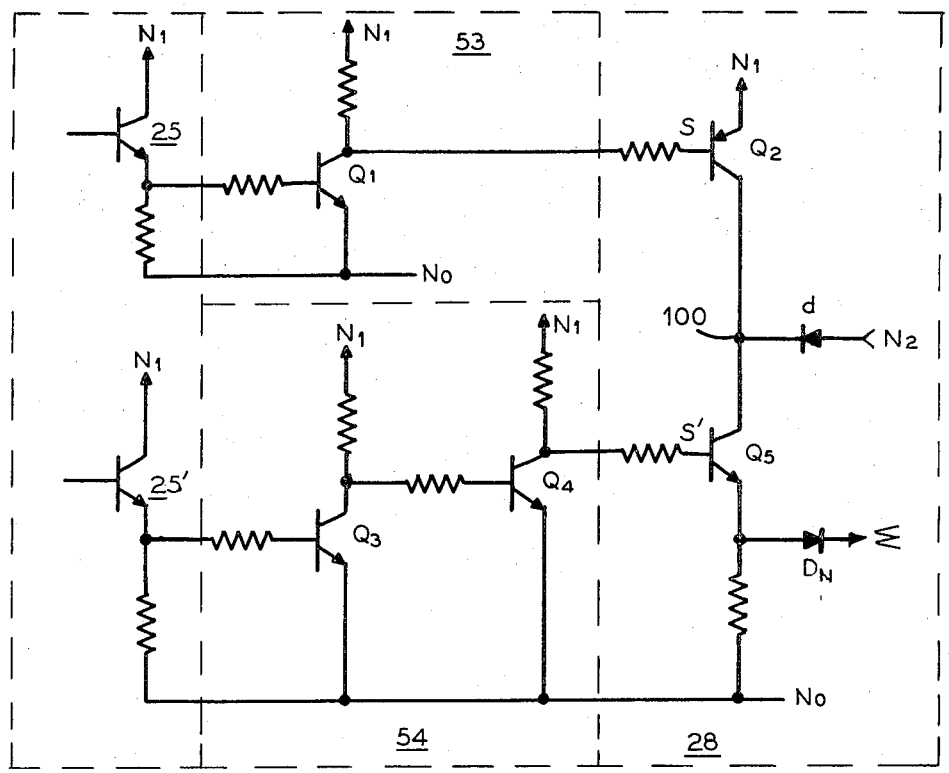
FIG. 9 shows a circuit for generating signals at the output of the meter station of FIG. 4.

FIG. 9 shows an example of a circuitry for the elements 25, 25', 53, 54 and 28 of FIG. 4 in which the photo detector 25 receives the optical signals obtained by scanning of the coded tracks 102 of the rollers 103, 104 ... of the counting unit, and the auxiliary photo detector 25' receives in synchronism the optical signals of the comb-like member 23 swept by the movable slot 26. These photo detectors are, for example, photo transistors (FIG. 9). Their emitters are connected respectively to the adaptation circuits 53 and 54, comprising transistors $Q_1$ and $Q_3$, $Q_4$ which furnish the rectangular signals S and S' indicated in FIGS. 8D and 8C, to the summing circuit 28. This summing circuit is constituted by transistors $Q_2$, $Q_5$ of complementary type, operating as switches and mounted in series with a source of voltage of amplitude $N_1$. Their common point 100 is connected via a diode d to a source of voltage of amplitude $N_2 < N_1$, for example such that $N_1 = 2N_2$. The output signal $\Sigma$ is taken from the emitter of the transistor $Q_5$ connected to the transmission line 61 (FIG. 1) through the isolation diode $D_n$.

It can be seen that if the transistor $Q_2$ is blocked by the signal S and $Q_5$ is unblocked by the signal S', the output is at the voltage level $N_2$. If $Q_2$ is conductive, on the contrary, the output is at the voltage level $N_1$. Finally, when the detectors 25 and 25' are not illuminated, $Q_2$ and $Q_5$ are blocked so that the output is at the reference potential $N_o$ such as ground. FIG. 8E shows the shape of the signals $\Sigma$ thus obtained, each level $N_1$ or $N_2$ corresponding to the logic level 1 or 0 of the code used on the tracks of the rollers.

With a view to passing from the interrogation of the $TR_n$ station to the interrogation of the $TR_{n-1}$ station (FIG. 1), an additional interval 36 (FIG. 4) can be provided at one of the ends of the comb-like member 23 so as to transmit light via an elementary bundle 37 of fibers to an auxiliary photodetector 29.

This photo detector generates a signal $F_L$ which triggers through an "end of reading" signal $R_n$ the interrogation of the following station by its associated reading device. This is done by means of an $R_n$ generator circuit 55 as will subsequently be explained. As shown in FIG. 4, the interval 36 with the admitting end of the elementary bundle 37 is at the right of the intervals 110. In its rest position, the slot 26 is further to the right of interval 36 thus masking all light admitting fiber ends.

In the course of its displacement in front of the comb-like member 23, the movable slot 26 effects a forward and return movement and generates two signals $F_L$ by means of the suxiliary photoelectric detector 29 (See diagram of FIG. 8F), one of these signals being at the beginning of the forward movement and the other at the end of the return movement; only this latter signal serves for triggering the interrogation of the following station.

Figure 10:
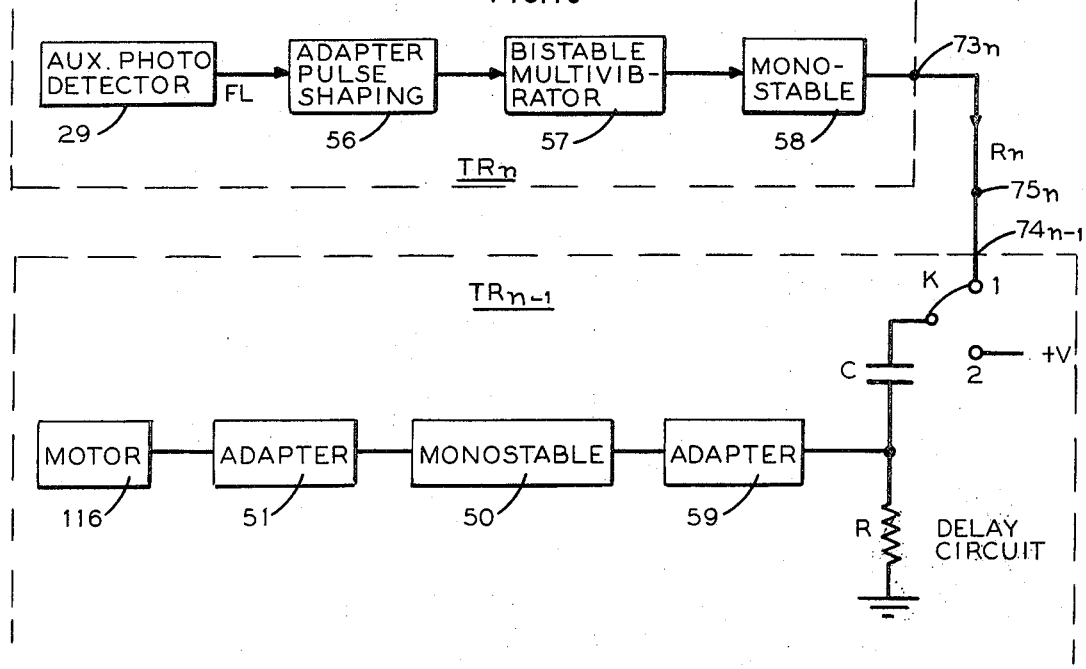
FIG. 10 shows output and input circuitry for controlling the reading operation of the meter station of FIG. 4.
Figure 11:
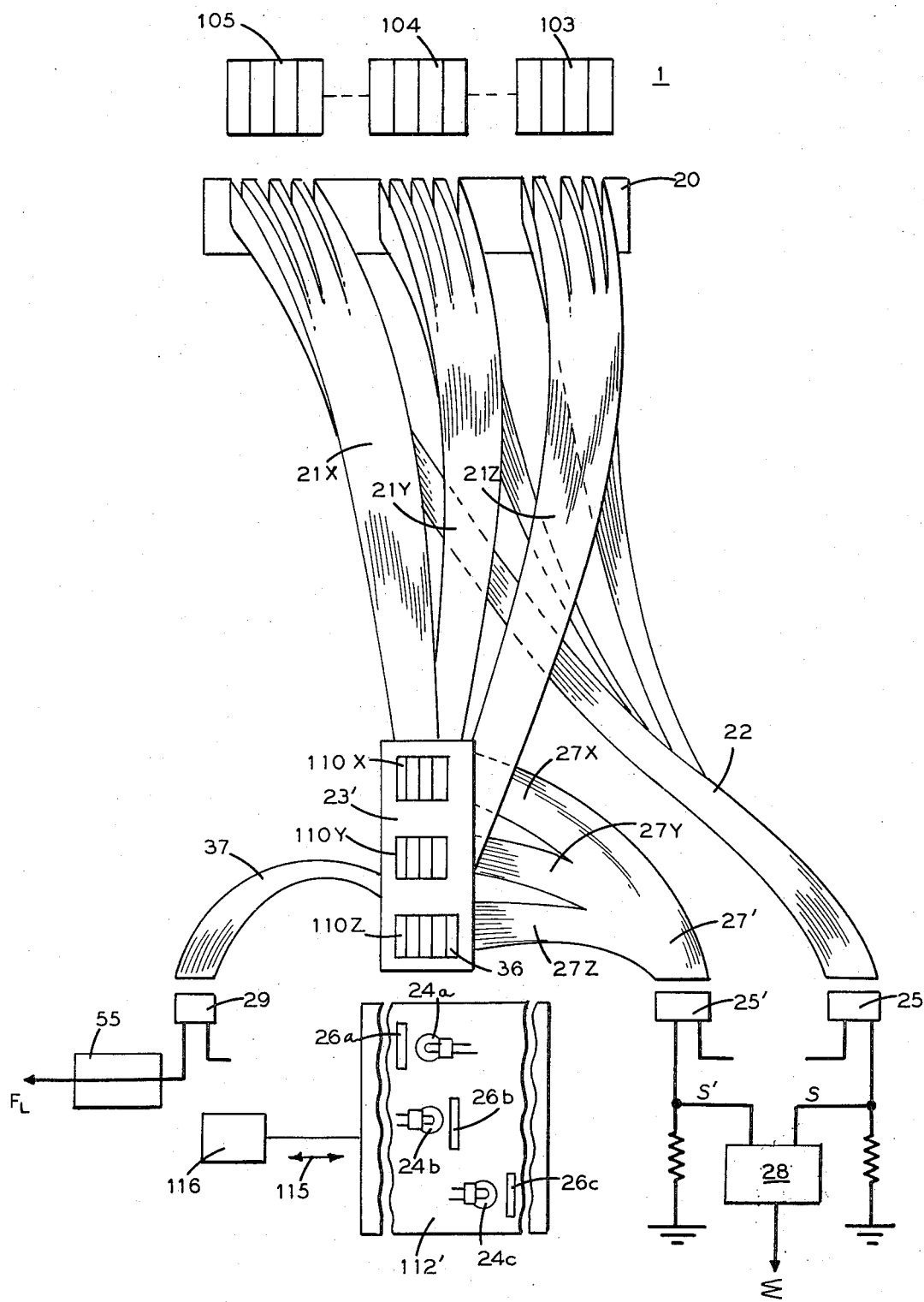
FIGS. 11 and 12 represent alternative arrangements of elements in the embodiment of FIG. 4.

For this purpose, the triggering circuit including the circuit 55 of FIG. 4 is constituted as shown in FIG. 10: the signals $F_L$ produced by the auxiliary photo detector 29 are fed, via an adapter circuit 56, to a bistable flip flop 57, followed by a monostable circuit 58. The flip flop 57 eliminates the first control signal at the beginning of the reading so as to trigger the monostable only by a control signal at the end of the reading cycle. The monostable 58 thus furnishes the end of reading signal $R_n$ to the station $TR_{n-1}$. This station comprises a switch K having two positions, a resistance-capacitance delay circuit RC, an adapter circuit 59 for the control of the monostable 50, and an adapter circuit 51, these elements constituting the controlling circuit 56 of the motor 116 driving the movable slot (FIG. 4) in its scanning displacement.

The signal $R_n$ (FIG. 10) of the monostable 58 thus triggers the monostable 50 with a delay introduced by the delay of the circuit RC to permit the processing of the reading signals from the station $TR_n$. The monostable 50 in turn controls the motor 116.

In all the stations other than the end station $TR_d$, the switch K is in position 1. As the station $TR_d$ does not receive any triggering signal from a preceding station, its circuit RC is connected directly with the voltage source +V (line 62) by the intermediary of the switch K placed in position 2. The light sources 24 of each station are connected directly by the voltage source V in this example, and are thus energized all at the same time when the central station 60 is switched on for an automatic reading sequence of all stations. Of course, those skilled in the art will recognize that a selective excitation of each source 24 only at the time of interrogation of its station can also be achieved if desired. The delay circuit RC of FIG. 10 may then be arranged to provide a time delay $t$ sufficient to let the filament of a light source heat before the motor 116 starts.

To briefly summarize the operation with reference to FIGS. 1, 4 and 10, and to the diagrams of FIGS. 8A to H, the voltage V is applied to the line 62 thus energizing light sources 24 and initiating the interrogation of the first station $TR_D$ (FIG. 1). Interrogations of the following stations and transmission of data therefrom occur sutomatically as shown by the following process for $TR_n$, for example.

A triggering pulse $R_{n+1}$ issued from $TR_{n+1}$ (FIG. 8A) enters motor control circuit 56 of station $TR_n$. After a time delay $t$ (FIGS. 8A and 8B), the monostable 50 is put to its unstable state (FIG. 8B) for a period of time sufficient for driving the motor 116 and the plate 112 all the way to the left, thus producing first a pulse $F_L$ (FIG. 8F) setting the bistable 57 of circuit 55 and then sequences of reference pulses S', data display pulses S, and added pulse $\Sigma = S + S'$ (FIGS. 8C, 8D, 8E), When the monostable 50 comes back to its stable state, the spring returns the plate to its initial position thus producing inverse sequences of pulses S', S, $\Sigma$ and finally a second pulse $F_L$ which resets the bistable 57 (FIGS. 8F, 8G, and 8H) which in turn sends a triggering signal $TR_n$ down to the next station $TR_{n-1}$.

In the embodiments just described a single switching slot 26 is used for sweeping intervals 110 of the comb-like member 23. In an alternate embodiment represented in FIG. 11, a holding member 23' for the light admitting ends of the transmitting bundles has three groups of four vertically elongated intervals $110_X$, $110_Y$ and $110_Z$ each respectively mounting emitting ends of bundles $21_x$, $21_y$ and $21_z$ transmitting light to the respective four tracks 102 of each of rollers 105, 104 and 103, respectively. Similar parts, some of them more schematically drawn than in FIG. 6, have the same reference numerals and will not be described again.

In alignment with intervals $110_z$ to the right thereof is the interval 36 of the auxiliary light transmitting bundle 37 for production of the $F_L$ signal by the detector 29. The intervals $110_X$, $110_Y$ and $110_Z$ are vertically displaced along parallel vertical lines and three bundles $27_X$, $27_Y$ and $27_Z$ collectively forming a supplementary bundle 27' have their admitting ends mounted therein jointly with the admitting ends of bundles $21_X$, $21_Y$, $21_Z$. The reference signal S' is produced by the photo detector 25'.

The motor 116 drives a rectilinearly movable plate 112' mounted in front of the holding member 23' and displaceable in a transverse direction shown by arrow 115 with respect to the elongated intervals. Three elongated vertical slots 26A, 26B, and 26C are formed in the plate 112, each having an associated light source 24A, 24B and 24C. The slots 26 are vertically displaced by the same amount as the intervals $110_X$, $110_Y$ and $110_Z$ and transversely offset with respect to one another by an amount greater than the transverse dimension of the groups of intervals 110. Thus when the plate 112' is actuated transversely to the left by the motor 116, the slot 26A is swept across the interval $110_X$ first, then slot 26B across $110_Y$ and finally slot 26C across $110_Z$ and 36. At the end of the return movement of plate 112', the interval 36 will be illuminated again to deliver the second $F_L$ signal.

Figure 12:
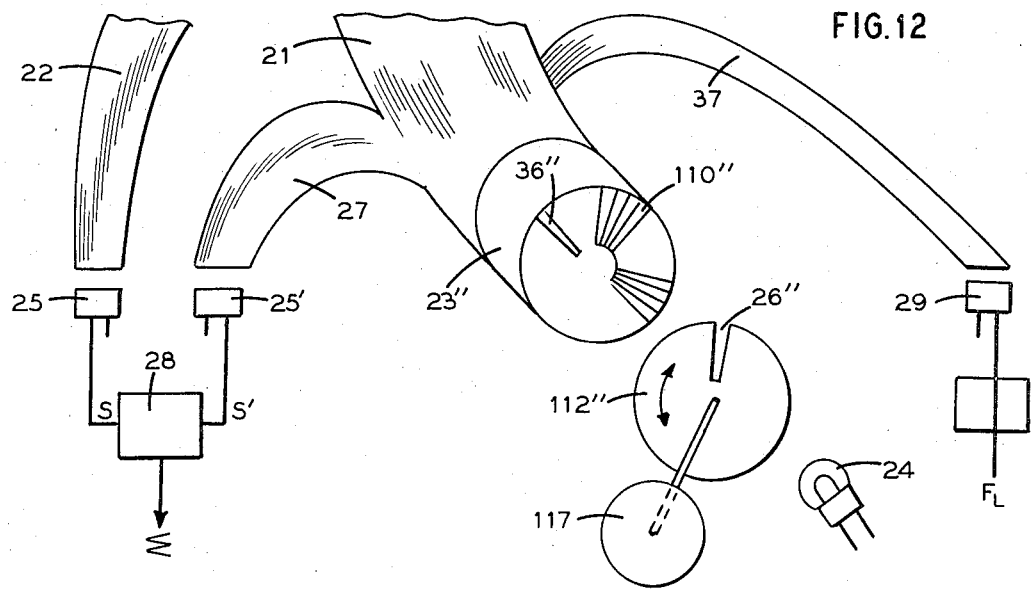
Figure 13:
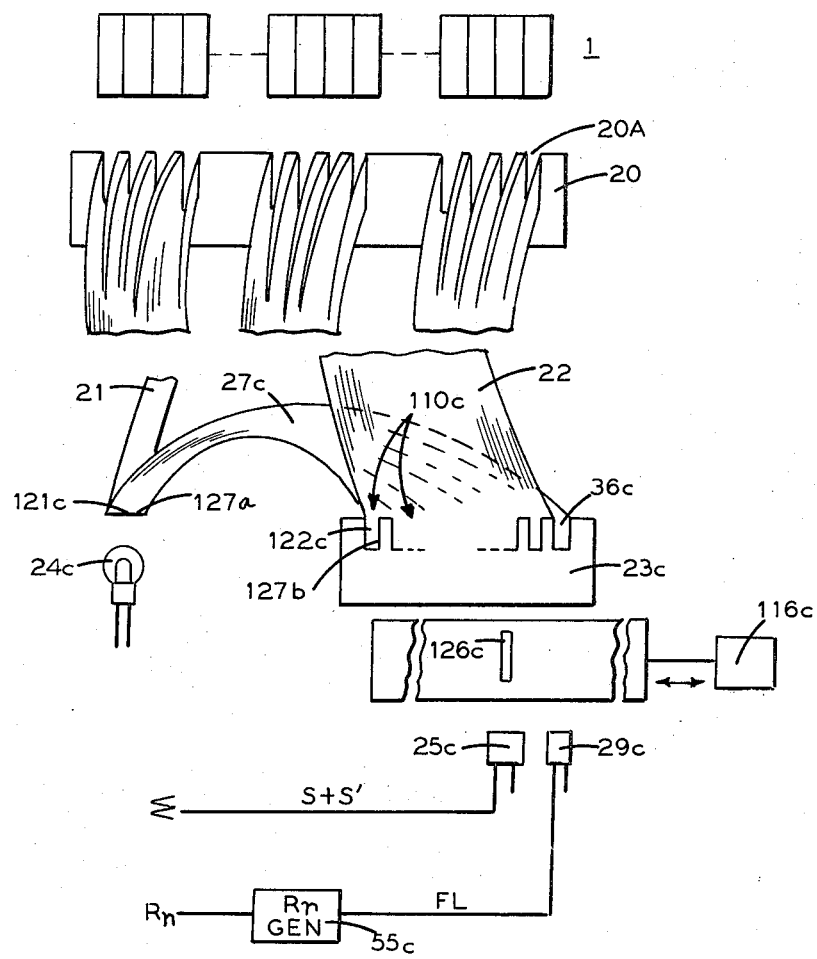
FIG. 13 shows a schematic diagram of a meter reading arrangement with mechanical output light switching.

Still another embodiment of the mechanical light switching arrangement for meters, as described with reference to FIG. 4, is shown in FIG. 12 where the light is switched at the input of the transmitting bundles for sequentially scanning the tracks. Instead of having a planar type of admitting-ends holding member such as 23 and 23', a cylindrical type 23" is used here. It has three series of four intervals 110" plus one $F_L$ interval 36", all these intervals being radially disposed at one base end of the cylinder 23" for holding respective emitting ends of the transmitting bundles. A rotatable plate 112" has a radial slot 26" made and is arranged in front of the one base end of the cylinder 23" to intercept light from the light source 24 for all light admitting fiber ends but those mounted in the particular intervals 110" uncovered by the slot 26" at the time. The slot 26" is successively swept across the intervals by a motor 117 rotatably driving the plate 112' to provide for sequential switching of the light illuminating the tracks on the rollers.

It should be noted that as a variant of all the preceding mechanical light switching arrangements, the light may be switched at the output of the receiving bundles of fibers instead of at the input of their transmitting counterpart. In this case illustrated by FIG. 13, all the light emitting ends of the transmitting bundle 21 are tied together in a single light input end 121C in the vicinity of a light source 24C. The probe 20 remains basically unchanged, each reading head 20A permanently illuminating the track opposite thereto and each of the receiving elementary bundles of the collective bundle 22 transmitting the light reflected by the respective track to its respective output end (or not reflected when the track zone in front of a reading head has a very low or no reflecting power). These output ends 122C are mounted in respective intervals 110C of the comb-like member 23 of FIG. 4. In each interval 110C is also mounted a light output end 127b of an additional elementary reference fiber or bundle of fibers, all such additional reference bundles being tied together in a single bundle 27C whose admitting end 127a is mounted for illumination by the source 24 adjacent to the admitting end 121C. In addition, one "end of reading" fiber or fiber bundle of the bundle 27C is secured all by itself to an interval 36C at the right of the other intervals 110C in member 23C.

With this arrangement a light signal made of the sum of light provided by output end 127b directly transmitted from the source 24 on the one hand, and of the reflected light transmitted from a track to the output end 122C, on the other hand, is available opposite each interval 110C. This summation light signal is detected by a photodetector 25C mounted on a movable opaque plate 112C opposite an elongated slot 126C parallel to the intervals 110C and substantially similar thereto in shape and size. The plate 112C can be moved back and forth transversely, starting from a position to the right, by a motor 116C identical to the motor discussed with reference to FIGS. 5 to 7. The slot 126C is movable across each of the intervals 110C to successively pass their respective light signal to the photodetector 25C, at the output of which electrical signal $\Sigma = S + S'$ directly appears for transmission on line 61. Thus a mechanical switching of the light output from the bundles 22 is provided for serial transmission of the data displayed by the counting unit. The control of the interrogation and reading operation is achieved as discussed for the embodiment of FIG. 4. It can be seen that a detector 29C is mounted stationary, opposite to the interval 36C on the other side of the plate 112C, so as to produce a first signal FL when the slot 126C is swept across 36C at the beginning of the movement of the plate and a second signal FL initiating the transmission of a triggering pulse $R_n$ by the triggering pulses generating circuit 55C.

The preceding devices necessitate, for the switching, the material displacement of an element, either the probe itself or a movable obturator. It is possible to achieve this switching by entirely stationary means.

Figure 14:
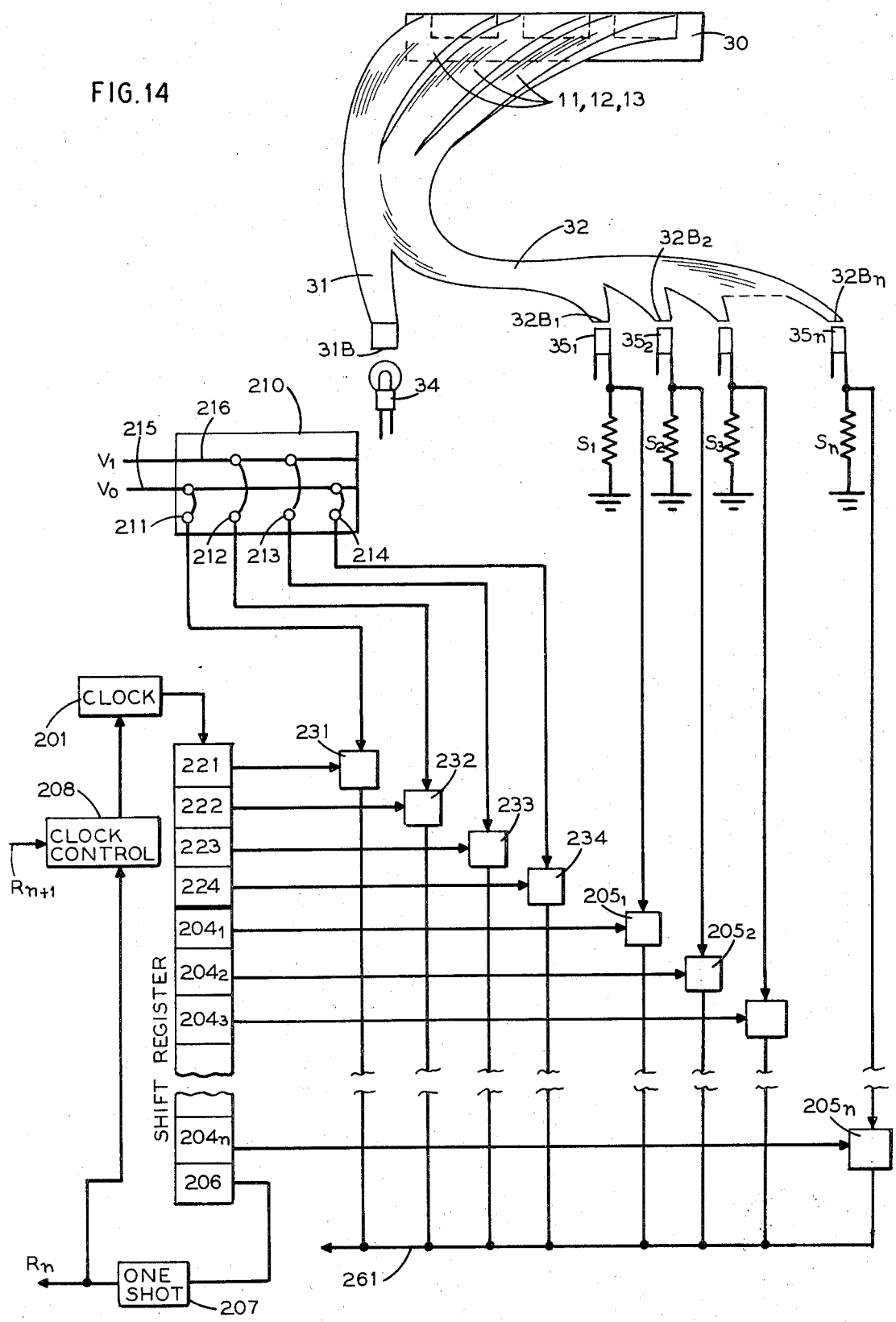
FIG. 14 and FIG. 15 schematically represent alternative meter reading arrangement with input and output electronic switching of signals respectively.

FIG. 14 represents a probe of this type in which the switching is obtained by electronic means. As in the embodiment of FIG. 13, the coded tracks of a totalizer are illuminated simultaneously by means of a probe 30 comprising elementary bundles, such as 11 of FIG. 2, of transmitting optical fibers, tied together at their other end into a common bundle 31 lit by the luminous source 34. The elementary bundles of receiving fibers, such as 12, 13 of FIG. 2, form a bundle 32 and lead to photo detectors $35_1$ to $35_n$, equal in number to the number n of coded tracks comprised by all of the rollers of the totalizer. Electrical signals $S_1$ to $S_n$ are then available at the detector's outputs for transmission in the parallel mode along n outputs. When transmission in the series mode along a single channel is preferred, the photo detectors 35 are normally blocked and only unblocked one after the other by an external clock signal so as to be rendered sensitive sequentially. Switch means comprising an auxiliary multiplexing device, realized for example by means of a distributor or a shift register progressing under the action of clock signals, effects the commutation of excitation of the various photo detectors themselves or alternatively the sequential interrogation of their output.

Such a sequential output interrogation circuit is described with reference to FIG. 14 wherein the photo detectors $35_1, 35_2, \ldots 35_n$ are simultaneously excited and convert the light signals at the respective output ends $32_{Bl}$ to $32_{Bn}$ of the elementary receiving bundles of fibers into electrical signals $S_1$ to $S_n$ in parallel at their outputs which outputs are sequentially interrogated by the switch means.

In this example, a coded address of the station $TR_n$ is shown which comprises a matrix 210 furnishing a coded pattern of signals in parallel at its four outputs 211, 212, 213 and 214 which are connected to two lines 215 and 216 having different voltage levels $V_0$ and $V_1$ according to a predetermined wiring arrangement.

A clock 201 feeds pulses to a shift register 202 whose first four stages 221 to 224 respectively enable four gates 231 to 234 to which the output terminals of the coded matrix 211 to 214 are connected. The outputs of gates 231 to 234 are connected to a common data transmission line 261 connecting the stations TR to the central interrogation station.

The other stages $204_1$ to $204_n$ of the shift register 202 respectively enable gates $205_1$ to $205_n$ to which the respective outputs detectors $35_1, 35_2,$ to $35_n$ are connected. The outputs of gates $205_1$ to $205_n$ are all coupled to line 261.

Upon excitation of the clock 201, the four bits of outputs 211 to 214 of the address are successively transmitted to line 261, followed by successive electrical signals $S_1$ to $S_n$ as the outputs of detectors $35_1$ to $35_n$ are serially connected to line 261 through the gates $205_1$ to $205_n$ sequentially enabled by the shift register 202.

The signals $S_1, S_2 \ldots S_n$ picked up at the output are thus available on the same channel, in the series mode.

As in the pseudo-static devices, an "end of reading" signal R is produced but here electronically, for example by counting the clock signals by means of a preselectable pulse counter which, at the reception of the $K^{th}$ clock signal, triggers the scanning of the totalizer of the next following station.

In FIG. 14 the shift register 202 has a last stage 206 which when energized at the end of the reading cycle throws a one-shot 207 into its unstable state, thus delivering the signal $R_n$ at its output for triggering interrogation of the next station down. A the same time, $R_n$ is applied to a clock control circuit 208 which stops the clock 201. This circuit 208 is responsive to the triggering signal $R_{n+1}$ released from the preceding station at the end of the reading cycle thereof, to start the clock 201.

Figure 15:
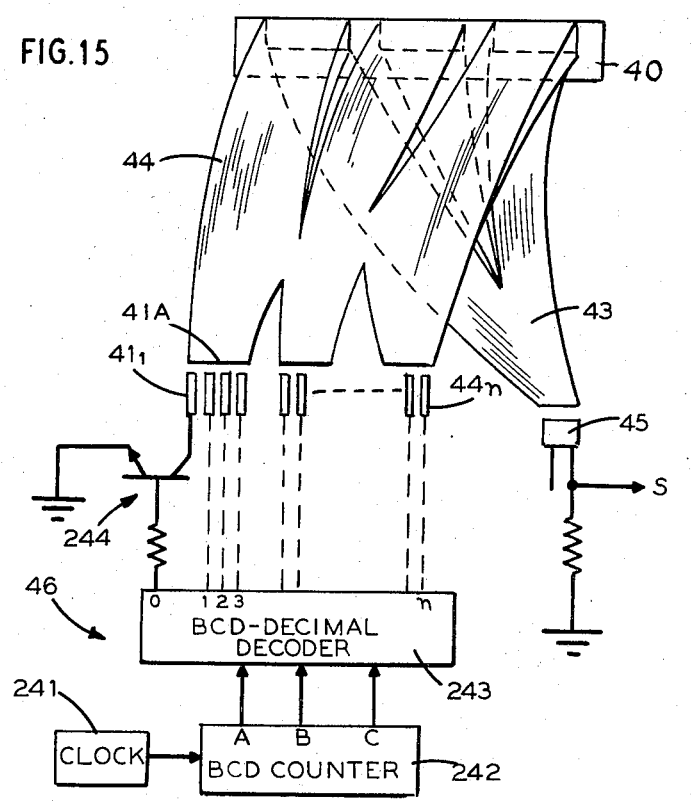

It is possible to arrange the switching on the transmitter side rather than on the receiver side, as is indicated in the schematic diagram of FIG. 15. Preferably, electroluminescent diodes (ELD) $44_1$ to $44_n$ are used as luminous sources and an auxiliary switching or multiplexing device 46 successively injects into each diode 44 a current determining its luminous emission. The admitting end 41A of each elementary transmission bundle is mounted in front of each diode 44 and all the transmitting bundles 41 are connected to the probe 40. The receiving elementary bundles are grouped into a bundle 43 leading to a single photo detector 45 which furnishes the coded signals S in series form. The switching device 46 includes a clock 241 which feeds a binary code decimal counter 242 having three outputs A, B, C which in turn feed a BCD - decimal decoder 243 with n outputs, each one controlling the operation of an individual ELD 44 through a transistor 244.

The photo detector 35 (FIG. 14) or the electroluminescent diodes 44 (FIG. 15) can be in the form of discrete elements, or preferably integrated into the network with the auxiliary multiplexing circuit.

Figure 16:
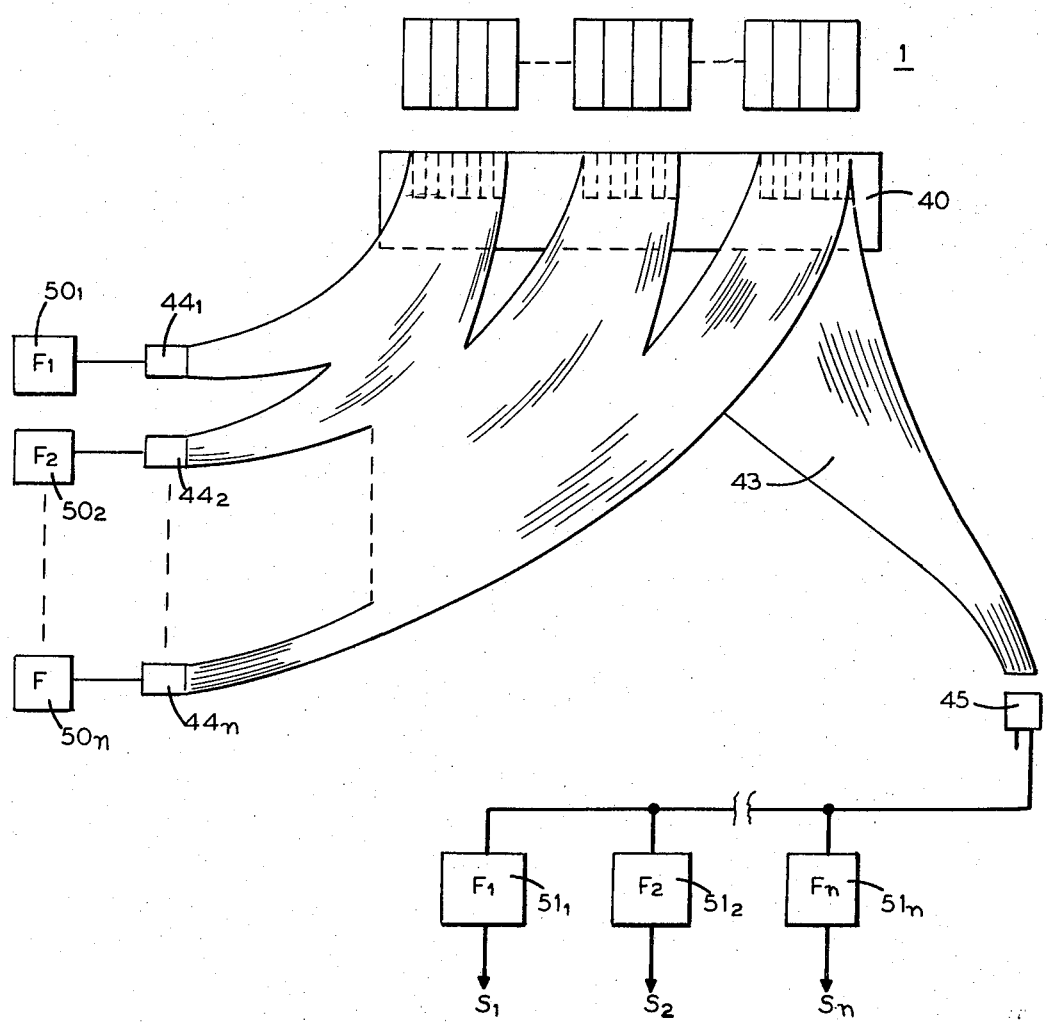
FIG. 16 illustrates a meter reading arrangement frequency modulation of the signals.

According to still another embodiment, use is made of electroluminsecent diodes as light sources and of photo detectors sensitive only to the wave length of the light emitted by these diodes, thus eliminating the influence of ambient light at the moment of the reading to provide an improved signal/noise ratio. If necessary, as illustrated by FIG. 16 for an arrangement of bundles identical to the one of FIG. 15, the light emitted by each ELD $44_1$ to $44_n$ can advantageously be frequency modulated by frequencies $F_1$ to $F_n$ thus facilitating the selection of the signals on the receiving side by filtering and synchronous detection of these modulation frequencies. In the arrangement of FIG. 16, instead of commanding the excitation of the n sources 44 sequentially, they operate simultaneously and are modulated at different frequencies $F_1$ to $F_n$ supplied by corresponding oscillators $50_1$ to $50_n$. At the output of the photo detector 45 are disposed n filters $51_1$ to $51_n$ in parallel, tuned to each of the frequencies of modulation $F_1$ to $F_n$ and delivering signals analogous to $S_1, S_2 \ldots S_n$. These signals are then available in parallel, or can be transmitted in series by multiplexing as explained before in connection with FIG. 14. As shown in this FIG. 16, the transmission of the indications of a totalizer should advantageously be accompanied by an indication of the corresponding address, and this can be materialized by a matrix furnishing coded address signals having two logic voltage levels and interrogated before or after the rollers of the totalizer.

In both cases, of pseudo-static and of static reading, the address can also be represented by an auxiliary optically-coded surface scanned before or after the data tracks associated with the respective rollers of the totalizer.

Of course, the invention is not limited only to the embodiments that have been described by way of example. Thus the bundles of transmitting and receiving optical fibers can be disposed in a different way such as shown in FIG. 3B or even more simply made by fibers of elongated cross-section, the probe of FIG. 3A then being constituted merely by three fibers disposed in a sandwich.

Figure 17:
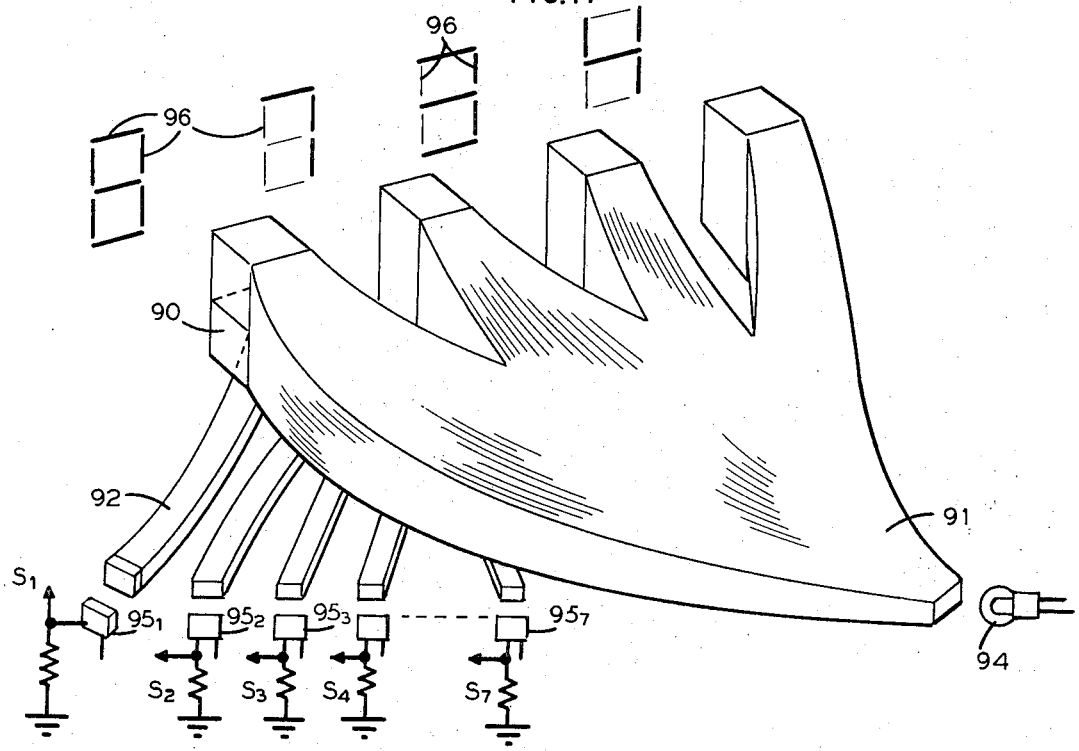
FIG. 17 illustrates a data reading arrangement for an alternative data displaying technique.

In the case in which, instead of being coded in binary form on special adjacent tracks, the decimal data are represented by stylized digits, having seven segments for example, the features of the invention are equally applicable by considering a seven (or more) bit code. To this end a multiple probe 90 is used for each roller, as shown in FIG. 17, comprising as assembly of seven (or more) elementary probes with reading heads disposed in accordance with the seven (or more) positions that the segments 96 constituting a digit can occupy. The arrangement of FIG. 17 is basically the same as shown in FIG. 4 with a main transmitting bundle admitting light from source 94 and elementary receiving bundles 92 each stemming from reading heads in front of a respective one of the seven reference positions 96 in which black or white segment zones are displayed according to the value of the digits on each roller. Each elementary receiving bundle leads light to a respective photo detector $95_1, 95_2, 95_3 \ldots 95_7$ thus furnishing signals $S_1$ to $S_7$ for each of the probes 90. Switching means can provide a serial transmission. Thus the seven possible segment positions comprise binary coded tracks similar to tracks 102 of FIG. 6, and the segment positions 96 can be sequentially scanned by means such as those described previously.

What is claimed is:

1. A meter system adapted for remote data reading, comprising:

a casing;

metering means for measuring a time varying quantity;

means in said casing to be driven by said metering means for totalizing such quantity with time, comprising a series of substantially coaxial interconnected counting wheels, each one of these wheels having an outer surface with zones of different reflection characteristics along at least one peripheral track on said wheel which represent data corresponding to alphanumerical indicia, these indicia being visible through said casing on a portion of said outer surface for visually displaying meter indications;

at least one reading unit having a light input end and a light output end and comprising at least one elementary reading unit for a respective such track on each of said wheels which includes a stationary reading head having adjacent light emitting and light receiving ends closely mounted opposite the respective track at a distance from the respective wheel surface of about one millimeter for preventing any light other than issued from said emitting end from striking a zone of such track facing said reading head, and optical guide means for transmitting light from the imput end of said reading unit via said emitting end to the respective track and for transmitting a luminous flux of such light, if any, reflected by the respective track from said receiving end to the output end of said reading unit;

means for supplying light to the input end of said reading unit;

detector means having output means, for converting an optical signal at the output end of said reading unit into an electrical signal;

said guide means being arranged in relation to said light supplying means and detector means for permitting one common optical signal for all said elementary reading heads to pass at one of the input and output ends of said reading unit, and a distinct optical signal for any one of said elementary reading units to pass at the other of said input and output ends; and scanning means associated with said reading unit and responsive to a scan control signal for producing at said output means an ordered sequence of electrical signals respectively representative of the optical signals transmitted by each said elementary reading unit to said output end, such sequence corresponding to a predetermined number of full scans of said elementary reading units, whereby meter indications displayed by zones on said tracks and read by said respective reading heads can be sequentially transmitted to a remote location according to the count of said counting wheels.

2. The apparatus of claim 1 wherein said scanning means includes means for switching such distinct optical signals at said other end of said reading unit, whereby optical signals respectively representative of data displayed by said tracks are sequentially transmitted to said detector in a predetermined order, and further, including a plurality of further guide means for transmitting light between respective first and second ends thereof, said first ends arranged for permitting one common optical signal to pass thereat and each one of said second ends mounted adjacent the guide means of a respective one of said elementary reading units at said other end of said reading unit for permitting a reference light signal to pass along with any such distinct signal at said switch means, to produce such electrical signals at said output means having two levels with respect to a reference level, one of said levels corresponding to simultaneous detection of said reference signal and of light at said output end reflected by a more reflective zone on one such track and the other level corresponding to simultaneous detection of said reference signal and of any light at said output end reflected by a less reflective zone on one such track.

3. The apparatus of claim 2 wherein said detector means further includes means for producing a reference electrical signal representative of said reference signal and said output means includes means for summing up said reference electrical signal and said electrically converted optical signal to produce said two levels electrical signal.

4. The apparatus of claim 1 wherein said scanning means includes a shutter movable at said other end of said reading unit and having an opening therein sized for passing one such distinct optical signal at a time, and motor means for moving said shutter to sequentially scan said guide means at said other end of said reading unit with said opening, whereby optical signals respectively representative of data displayed by said tracks are sequentially transmitted to said detector means in accordance with the scanning order of said guide means.

5. The apparatus of claim 4 further including means for producing an "end of reading" signal, comprising auxiliary photodetector means and auxiliary optical guide means for transmitting light to said auxiliary photodetector means via an "end of reading" position reached by said shutter opening after a full scan of said guide means at said other end of said reading unit.

6. The apparatus of claim 4 wherein said motor means is operatively arranged for reciprocating said shutter between a rest position and a maximum offset position to scan said guide means at said other end of said reading unit at least twice during a reading cycle, said "end of reading" position being adjacent to said rest position, and said "end of reading" signal producing means further includes divider means coupled to the output of said auxiliary photodetector means for generating the "end of reading" signal only upon return of said shutter toward said rest position at the end of the reading cycle.

7. The apparatus of claim 1 wherein said scanning means includes pulse responsive means for controlling said ordered sequence of signals at said output means and further comprising means for generating an "end of reading signal" upon reception of a predetermined number of pulses by said controlling means.

8. The apparatus of claim 1 wherein said other end of said reading unit is the output end thereof, said detector means has different light inputs respectively responsive to such distinct signals from each said elementary reading units at said output end, and said scanning means includes pulse responsive means for controlling said sequence of signals at said output means.

9. The apparatus of claim 1 wherein said one end of said reading unit is the input end thereof, said light supplying means includes a plurality of light sources for illuminating corresponding one of said guide means at said input end, and said scanning means includes pulse responsive means for sequentially switching on said light sources.

10. The apparatus of claim 1 wherein said one end of said reading unit is the input end thereof, said light supplying means includes a plurality of light sources for illuminating corresponding ones of said guide means at said input end, said light sources producing lights having different frequencies, said detector means includes a plurality of filter means respectively responsive to a different one of said frequencies, and said scanning means include means for sequentially switching the output of said respective filter means to said output means.

11. The apparatus of claim 1 wherein said light supplying means include means for producing light of selected frequency and said detector means include filter means responsive to the selected frequency.

12. The apparatus of claim 1 comprising a first and second such reading units, said first unit having means responsive to operation of first such scanning means associated therewith for generating a control signal and said second reading unit having means responsive to said control signal for triggering second such scanning means associated therewith to operate said second reading unit.

* * * * *